(12) United States Patent
Fu et al.

(10) Patent No.: US 8,055,103 B2
(45) Date of Patent: Nov. 8, 2011

(54) OBJECT-BASED IMAGE SEARCH SYSTEM AND METHOD

(75) Inventors: Hsin Chia Fu, Hsinchu (TW); Yeong Yuh Xu, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 1017 days.

(21) Appl. No.: 11/759,911

(22) Filed: Jun. 7, 2007

(65) Prior Publication Data
US 2007/0286531 A1 Dec. 13, 2007

(30) Foreign Application Priority Data
Jun. 8, 2006 (TW) .............................. 95120438 A

(51) Int. Cl.
*G06K 9/54* (2006.01)
(52) U.S. Cl. ......... 382/305; 382/190; 382/201; 382/203
(58) Field of Classification Search .................... 382/305
See application file for complete search history.

(56) References Cited

U.S. PATENT DOCUMENTS

| | | | | |
|---|---|---|---|---|
| 5,579,471 A * | 11/1996 | Barber et al. | ................. | 715/700 |
| 5,751,286 A * | 5/1998 | Barber et al. | ................. | 715/835 |
| 5,893,095 A * | 4/1999 | Jain et al. | ............................... | 1/1 |
| 5,913,205 A * | 6/1999 | Jain et al. | ............................... | 1/1 |
| 5,983,237 A * | 11/1999 | Jain et al. | ............................... | 1/1 |
| 6,445,834 B1 * | 9/2002 | Rising, III | ..................... | 382/305 |
| 6,480,840 B2 * | 11/2002 | Zhu et al. | ............................... | 1/1 |
| 6,556,713 B2 * | 4/2003 | Kobayashi et al. | ........... | 382/224 |
| 6,584,221 B1 * | 6/2003 | Moghaddam et al. | ........ | 382/165 |
| 6,687,416 B2 * | 2/2004 | Wang | ............................ | 382/278 |
| 6,741,655 B1 * | 5/2004 | Chang et al. | ............. | 375/240.26 |
| 6,741,744 B1 * | 5/2004 | Hsu | ............................... | 382/229 |
| 6,826,316 B2 | 11/2004 | Luo et al. | | |
| 6,847,733 B2 * | 1/2005 | Savakis et al. | ................ | 382/225 |
| 6,859,802 B1 | 2/2005 | Rui | | |
| 6,968,095 B1 * | 11/2005 | Yamamoto et al. | ........... | 382/305 |
| 6,970,859 B1 * | 11/2005 | Brechner et al. | ....................... | 1/1 |
| 7,016,916 B1 * | 3/2006 | Lee et al. | ............................... | 1/1 |
| 7,043,094 B2 * | 5/2006 | Thomas et al. | ............... | 382/305 |
| 7,054,861 B2 * | 5/2006 | Kobayashi et al. | .................... | 1/1 |
| 7,062,083 B2 | 6/2006 | Lim et al. | | |
| 7,483,919 B2 | 1/2009 | Galperin | | |
| 2004/0071368 A1 * | 4/2004 | Chadha et al. | ................ | 382/305 |
| 2004/0170337 A1 * | 9/2004 | Simon et al. | .................. | 382/254 |
| 2004/0247206 A1 * | 12/2004 | Kaneda et al. | ................ | 382/305 |
| 2005/0086210 A1 * | 4/2005 | Kita et al. | .......................... | 707/3 |
| 2005/0163344 A1 * | 7/2005 | Kayahara et al. | ............. | 382/103 |

(Continued)

OTHER PUBLICATIONS

Y. Rui, et al, Relevance feedback: A Power tool for Interactive Content-Based Image Retrieval, IEEE Transactions On Circuit And Video Technology, 8(5):644-655, Sep. 1998.

(Continued)

*Primary Examiner* — Sath V Perungavoor
(74) *Attorney, Agent, or Firm* — Rosenberg, Klein & Lee

(57) ABSTRACT

The present invention discloses an object-based image search system and method, whereby a user may visually specify query objects for retrieving relevant images without using any image-segmenting software tool. The method of the present invention comprises: specifying target feature points from sample images which are displayed in an image query interface and determining logic relationships of the target feature points; utilizing a feature-point checking program to correlate the target feature points with target objects; utilizing a feature-similarity calculating program to find out the images relevant to the target objects via the image feature parameters stored in a feature database; arranging and presenting the relevant images in sequence.

8 Claims, 13 Drawing Sheets

U.S. PATENT DOCUMENTS

2005/0271304 A1* 12/2005 Retterath et al. .............. 382/305
2006/0083443 A1* 4/2006 Tojo .............................. 382/305

OTHER PUBLICATIONS

Xiang Sean Zhou, et al, Image Retrieval With Relevance Feedback: from heuristic weight adjustment to optional learning methods, ICIP (3): 2-5, 2001.

Xiang Sean Zhou, et al, Comparing Discriminating Transactions and SVM for Learning During Multimedia Retrieval, ACM Multimedia 2001: 137-146.

Zhong Su, et al, Relevance Feedback In Content-Based Image Retrieval: Bayesian Framework, feature subspaces and progressive learning, IEEE Transactions on Image Processing 12(8): 924-937, 2003.

* cited by examiner

| ID 241 | keyword 242 | color parameter 243 | texture parameter 244 | shape parameter 245 | position parameter 246 |
|---|---|---|---|---|---|
| 1 | $Key_{1,1}$<br>$Key_{1,2}$<br>... | $(h_{1,1}, s_{1,1}, v_{1,1})$<br>$(h_{1,2}, s_{1,2}, v_{1,2})$<br>......<br>$(h_{1,m1}, s_{1,m1}, v_{1,m1})$ | $(t_{1,1,1}), (t_{1,1,2}), \ldots (t_{1,1,10})$<br>$(t_{1,2,1}), (t_{1,2,2}), \ldots (t_{1,2,10})$<br>......<br>$(t_{1,m1,1}), (t_{1,m1,2}), \ldots (t_{1,m1,10})$ | $(\theta_{1,1})$<br>$(\theta_{1,2})$<br>......<br>$(\theta_{1,m1})$ | $(x_{1,1}, y_{1,1})$<br>$(x_{1,2}, y_{1,2})$<br>......<br>$(x_{1,m1}, y_{1,m1})$ |
| 2 | $Key_{2,1}$<br>$Key_{2,2}$<br>... | $(h_{2,1}, s_{2,1}, v_{2,1})$<br>$(h_{2,2}, s_{2,2}, v_{2,2})$<br>......<br>$(h_{2,m1}, s_{2,m1}, v_{2,m1})$ | $(t_{2,1,1}), (t_{2,1,2}), \ldots (t_{2,1,10})$<br>$(t_{2,2,1}), (t_{2,2,2}), \ldots (t_{2,2,10})$<br>......<br>$(t_{2,m2,1}), (t_{2,m2,2}), \ldots (t_{2,m2,10})$ | $(\theta_{2,1})$<br>$(\theta_{2,2})$<br>......<br>$(\theta_{2,m1})$ | $(x_{2,1}, y_{2,1})$<br>$(x_{2,2}, y_{2,2})$<br>......<br>$(x_{2,m2}, y_{2,m2})$ |
| ... | | | | | ... |
| i | $Key_{i,1}$<br>$Key_{i,2}$<br>... | $(h_{i,1}, s_{i,1}, v_{i,1})$<br>$(h_{i,2}, s_{i,2}, v_{i,2})$<br>......<br>$(h_{i,mi}, s_{i,mi}, v_{i,mi})$ | $(t_{i,1,1}), (t_{i,1,2}), \ldots (t_{i,1,10})$<br>$(t_{i,2,1}), (t_{i,2,2}), \ldots (t_{i,2,10})$<br>......<br>$(t_{i,mi,1}), (t_{i,mi,2}), \ldots (t_{i,mi,10})$ | $(\theta_{i,1})$<br>$(\theta_{i,2})$<br>......<br>$(\theta_{i,mi})$ | $(x_{i,1}, y_{i,1})$<br>$(x_{i,2}, y_{i,2})$<br>......<br>$(x_{i,mi}, y_{i,mi})$ |
| j | $Key_{j,1}$<br>$Key_{j,2}$<br>... | $(h_{j,1}, s_{j,1}, v_{j,1})$<br>$(h_{j,2}, s_{j,2}, v_{j,2})$<br>......<br>$(h_{j,m1}, s_{j,m1}, v_{j,m1})$ | $(t_{j,1,1}), (t_{j,1,2}), \ldots (t_{j,1,10})$<br>$(t_{j,2,1}), (t_{j,2,2}), \ldots (t_{j,2,10})$<br>......<br>$(t_{j,mi,1}), (t_{j,mi,2}), \ldots (t_{j,mi,10})$ | $(\theta_{j,1})$<br>$(\theta_{j,2})$<br>......<br>$(\theta_{j,mi})$ | $(x_{j,1}, y_{j,1})$<br>$(x_{j,2}, y_{j,2})$<br>......<br>$(x_{j,mi}, y_{j,mi})$ |

Fig.4

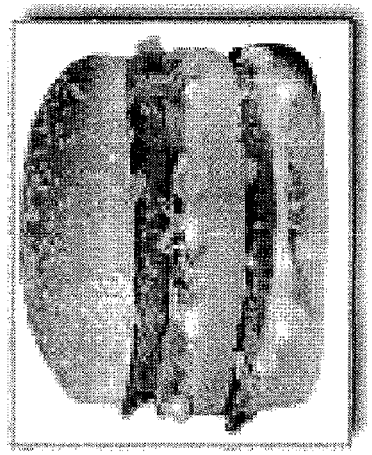
3
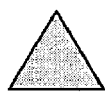
next page
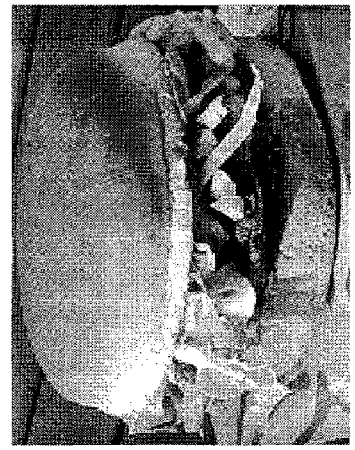
2
back to search homepage
Fig.8
previous page
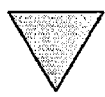
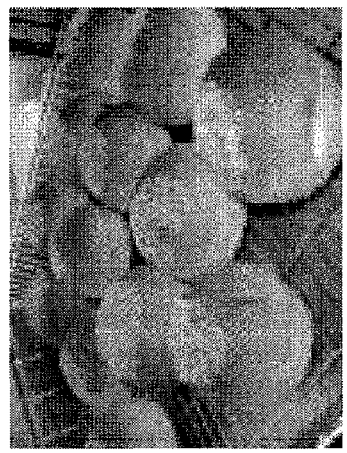
1

| object \ position relationship | R | U | L | D | RU | UL | LD | DR |
|---|---|---|---|---|---|---|---|---|
| E1 | E2 | ⋮ | ⋮ | ⋮ | ⋮ | ⋮ | E4 | E3 |
| E2 | ⋮ | ⋮ | E1 | ⋮ | ⋮ | ⋮ | E3,E4 | ⋮ |
| E3 | ⋮ | ⋮ | E4 | ⋮ | E2 | E1 | ⋮ | ⋮ |
| E4 | E3 | ⋮ | ⋮ | ⋮ | E1 | ⋮ | ⋮ | ⋮ |

| object \ position relationship | L | D | LD | DR |
|---|---|---|---|---|
| E1 | ...... | ...... | E4 | E3 |
| E2 | E1 | ...... | E3,E4 | ...... |
| E3 | E4 | ...... | ...... | ...... |
| E4 | ...... | ...... | ...... | ...... |

Fig.12

| position relationship object | L | D | LD | DR |
|---|---|---|---|---|
| F1 | ..... | ..... | F4 | F3 |
| F2 | F1 | ..... | F3,F4 | ..... |
| F3 | F4 | ..... | ..... | ..... |
| F4 | ..... | ..... | ..... | ..... |

| object / position relationship | L | D | LD | DR |
|---|---|---|---|---|
| G1 | ⋮ | ⋮ | G4 | G3 |
| G2 | G1 | ⋮ | G4 | G3 |
| G3 | G4 | ⋮ | ⋮ | ⋮ |
| G4 | ⋮ | ⋮ | ⋮ | ⋮ |

OBJECT-BASED IMAGE SEARCH SYSTEM AND METHOD

BACKGROUND OF THE INVENTION

1. Field of the Invention

The present invention relates to image search, particularly to an object-based image search.

2. Description of the Related Art

Due to the fast advance of computer science, digital contents, particularly digital image data, expand explosively. Thus, how to obtain desired images from massive image data becomes an important topic.

One of the existing search methods is using contents-description words to search for desired images. However, annotating a massive image data is a laborious work. Further, the semantic gap between the annotator and the searcher often influences the search results.

A U.S. Pat. No. 6,859,802 B1 disclosed a method using "user's relevance feedback" to search for desired images. However, the "user's relevant feedback" usually cannot indeed express the target images. For example, when a user intends to search for images having a beach, he selects several pictures containing a beach and feedbacks them to a search system. The system analyzes the components of those pictures, such as colors, textures, edges, etc., and finally recognizes that all those pictures contain a beach. The common feature is then used as the key feature to find out beach-containing pictures from the database. However, a picture containing a beach usually also contains a scene of sea. Thus, the search system is likely to regard "sea" as the common feature and thus retrieves incorrect pictures containing only "sea" but without a beach. To overcome such a problem, the user has to provide the system sample pictures containing "beach" but without "sea". However, it is a laborious and troublesome task. Therefore, complicated algorithms were proposed to improve the abovementioned drawback. Nevertheless, target objects are still hard to directly and correctly define. For the details, refer to Xiang Sean Zhou and T. S. Huang, "Relevance Feedback for Image Retrieval: a Comprehensive Review", ACM Multimedia Systems, 8(6): 536-544, 2003.

Recently, some researchers have proposed object-based image search system, wherein a user defines key objects in sample images, and the system performs searches according the key objects (Refer to M. S. Drew, Z. N. Li, and Z. Tauber, "Illumination Color Covariant Locale-Based Visual Object Retrieval", Pattern Recognition, 35(8): 87-1704, 2002). Such a method enables users to directly define target objects and thus has much better search results than previous methods. However, defining target objects in sample images usually needs an image-segmenting software tool, such as a "Magic Wand" or a "Snake" (Refer to Ze-Nian Li and Mark S. Drew, "Fundamentals of Multimedia-Chapter 18", Pearson Prentice Hall PTR, Upper Saddle River, N.J., 2004). Thus, users have to install and learn these tools. It is indeed a trouble for those who just intend to search for desired pictures but do not want to learn any image-segmenting software tool. The biggest drawback of this method is that the image-segmenting tool cannot precisely segment an object from the image, which has been a stickler in the field for many years. When searches are based on the features extracted from the inaccurate objects segmented by the abovementioned tool, the search results are unlikely to be satisfactory naturally.

Accordingly, the present invention proposes an object-based image search system and a method thereof to overcome the abovementioned problems.

SUMMARY OF THE INVENTION

The primary objective of the present invention is to provide an object-based image search system and method, which greatly humanizes image-searching tasks, and whereby a user may visually specify an image-query task via directly designating desired target objects on an image query interface.

Another objective of the present invention is to provide an object-based image search system and method, which greatly conveniences image-searching tasks, and whereby a user may perform an image-searching task without using any image-segmenting software tool, such as a "Magic Wand" or a "Snake", and the search system may be free from the errors caused by an improper executing of image-segmenting software.

Yet another objective of the present invention is to provide an object-based image search system and method, which may increase users' desire to use the image search system and method, and whereby a user may perform logic operations on the query items to attain search results without any undesired feature via actively selecting desired target features and screening out undesired target features.

Further another objective of the present invention is to provide an object-based image search system and method, wherein the comparison of an image-searching task is based on color parameters, texture parameters and shape parameters, and the search task is further based on the relative position of the target objects determined by the user.

To achieve the abovementioned objectives, the present invention proposes an image search method, which retrieves at least one relevant image from a plurality of candidate images via computerized calculations, and wherein each candidate image has at least one candidate object, and each candidate object has a plurality of candidate-object feature parameters. The image search method of the present invention comprises the following steps:

providing an image query interface, wherein the image query interface may present p sample images, and a user may visually specify q target feature points from the p sample images, where $p \geq 1$, and $q \geq 1$;

locating q corresponding target objects from the p sample images according to the q target feature points, wherein each of the q target objects has a plurality of target-object feature parameters;

performing similarity calculations based on the candidate-object feature parameters and the target-object feature parameters to retrieve images relevant to the q target objects; and arranging the relevant images in sequence according to the values obtained in the similarity calculations and outputting the relevant images having been arranged in sequence.

The present invention also proposes an image search system, which retrieves at least one relevant image from a plurality of candidate images via computerized calculations and comprises a processor, a memory and a storage device, wherein the memory has an image search engine, and the storage device has an image database, and the image database contains a plurality of candidate images, and the processor operates the image search engine to realize the following mechanisms:

Mechanism A: providing an image query interface, wherein the image query interface may present p sample images, and a user may selects q target feature points from the p sample images, where $p \geq 1$, and $q \geq 1$;

Mechanism B: locating q corresponding target objects from the p sample images according to the q target feature points, wherein each of the q target objects has a plurality of target-object feature parameters;

Mechanism C: performing similarity calculations between the q target objects and the plurality of the candidate images to retrieve images relevant to the q target objects, wherein each candidate image has at least one candidate object, and each candidate object has a plurality of candidate-object feature parameters that cooperate with the target-object feature parameters of the q target objects to implement the similarity calculations; and Mechanism D: arranging the candidate images in sequence according to the values obtained in the similarity calculations and outputting the candidate images having been arranged in sequence.

Below, the embodiments are described in detail to make easily understood the objectives, technical contents, characteristics and accomplishments of the present invention.

BRIEF DESCRIPTION OF THE DRAWINGS

FIG. 4 is a diagram schematically showing an embodiment of a feature database according to the present invention;

FIG. 8 is a diagram schematically showing that an image query interface presents relevant images according to the present invention;

FIG. 12 is a diagram showing a simplified relative-position matrix of the target objects shown in FIG. 10;

DETAILED DESCRIPTION OF THE INVENTION

Below, the present invention is exemplified with the embodiments of searching for images over a communication network.

Figure 1:
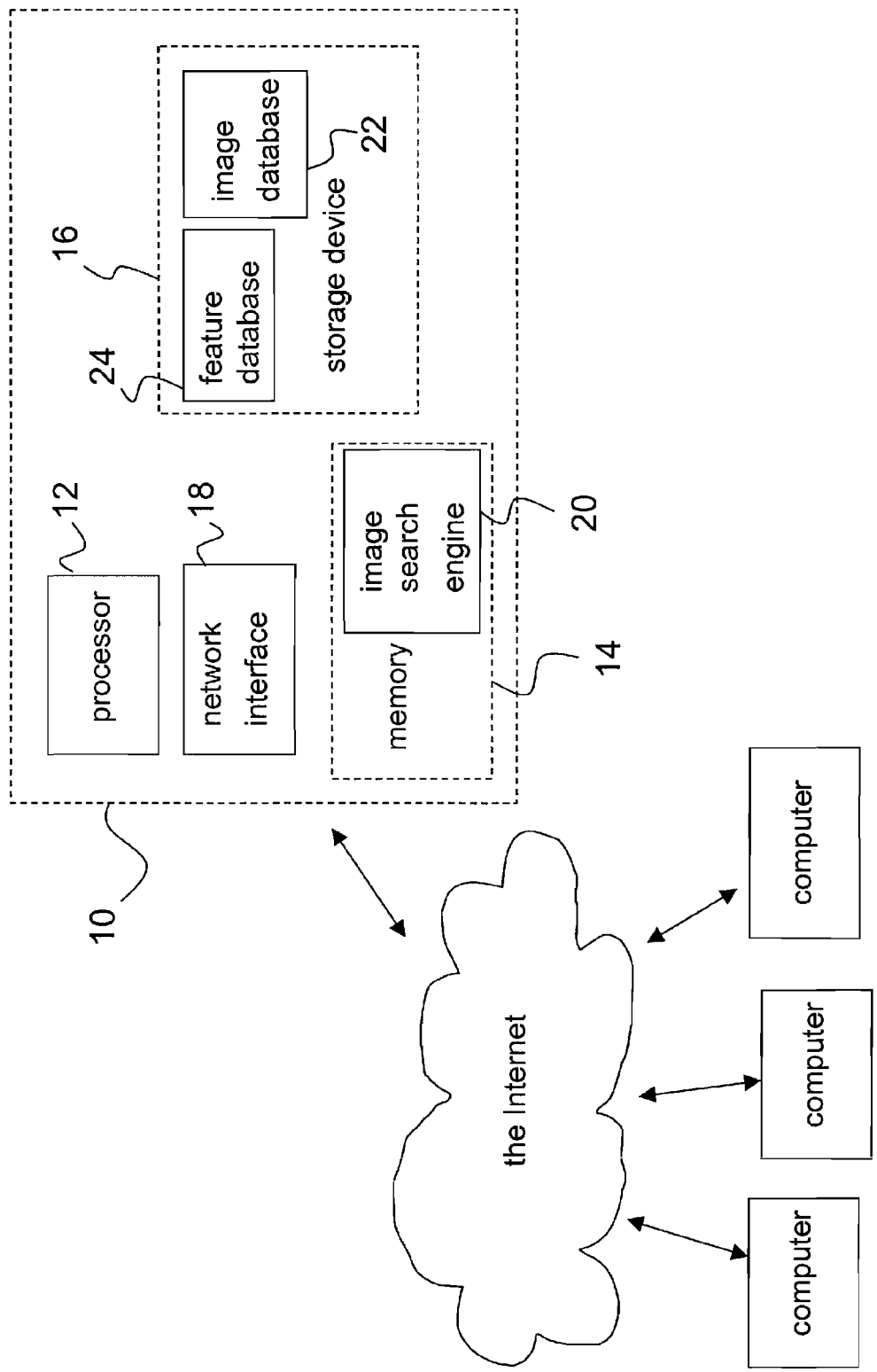
FIG. 1 is a diagram schematically showing that a user links with the image search system of the present invention via a computer and a communication network.

Refer to FIG. 1 a diagram schematically showing that a user links with the image search system of the present invention via a computer and a network.

Similar to a common server, the image search system 10 shown in FIG. 1 comprises a processor 12, a memory 14, a storage device 16 and a network interface 18, wherein the memory 14 has an image search engine 20, and the storage device 16 has an image database 22 and a feature database 24.

It is to be noted that the image search system 10 may comprises a plurality of computers or servers. For example, one server is responsible for the image search engine, and the other server is responsible for the image database and the feature database; the servers or computers are interconnected via an intranet or an extranet (such as the Internet).

Figure 2:
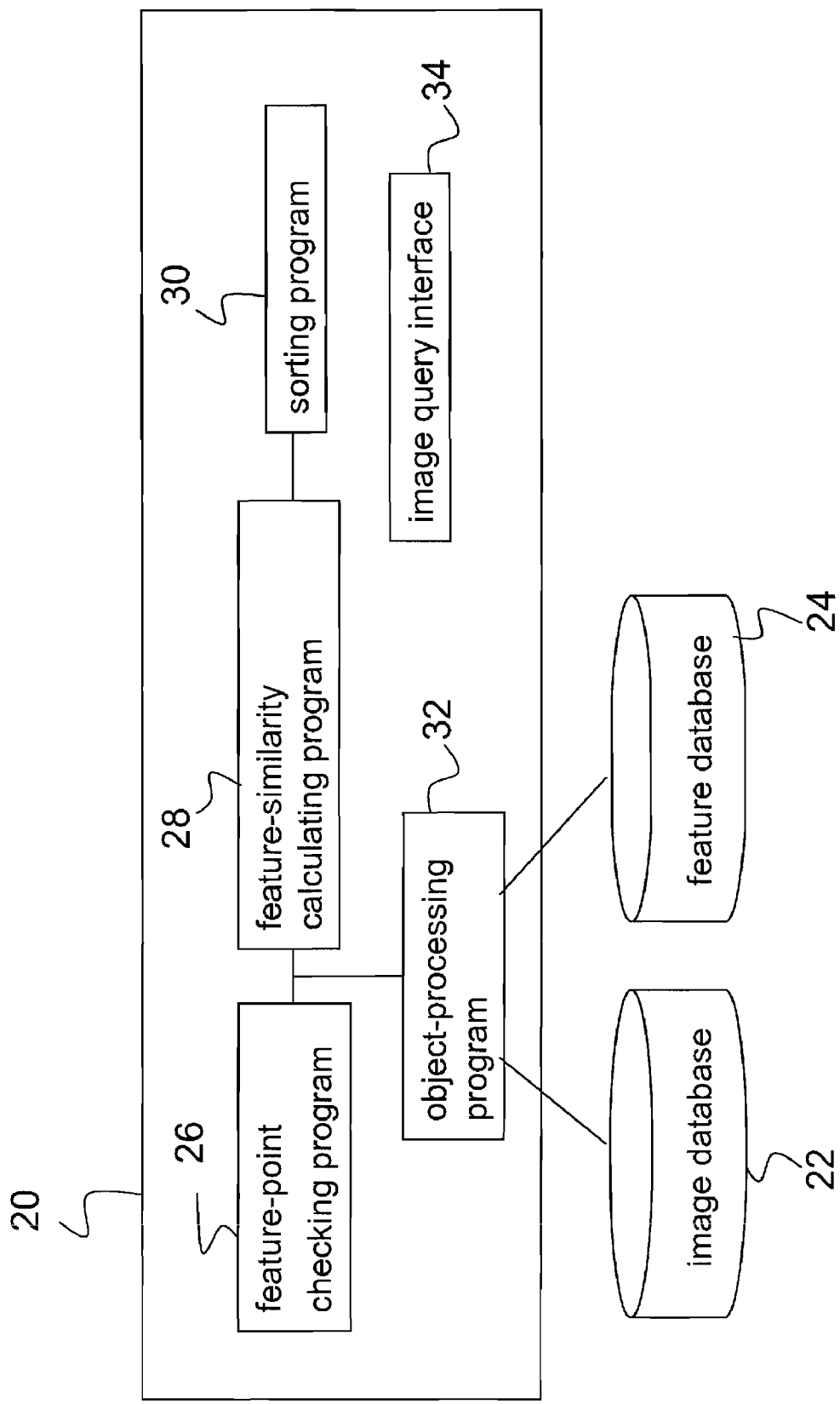
FIG. 2 is a diagram schematically showing that the architecture of the image search system according to the present invention.

Refer to FIG. 2. The image search engine 20 comprises a feature-point checking program 26, a feature-similarity calculating program 28, a sorting program 30, an object-processing program 32 and an image search interface 34.

The image database 22 comprises a plurality of images (such as photographs, pictures, figures and diagrams drawn by computers, etc.). Each image is processed into a plurality of objects by the object-processing program 32, and a plurality of target-feature parameters are extracted from each object.

Figure 3:
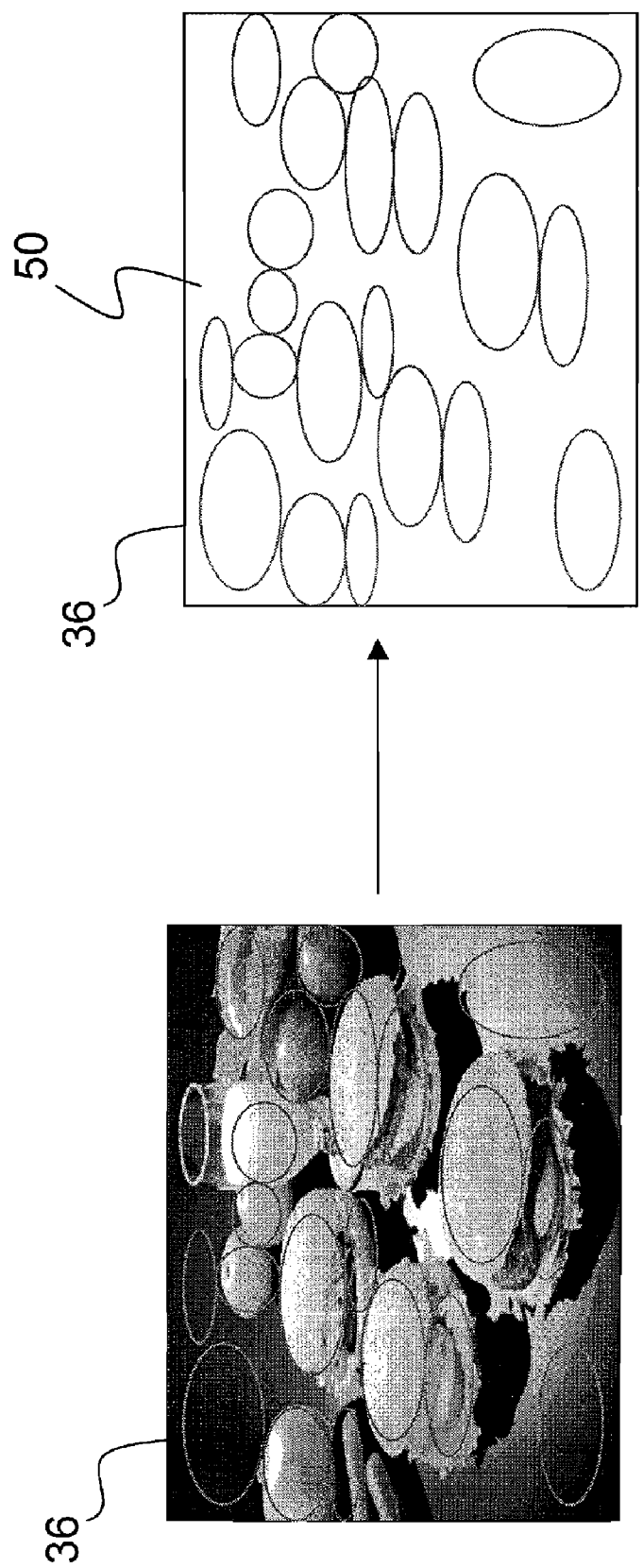
FIG. 3 is a diagram schematically showing that an image is processed into a plurality of objects according to the present invention.

Refer to FIG. 3 a diagram schematically showing that a hamburger image 36 is processed into $m_i$ pieces of objects 50 by the object-processing program 32, wherein each object is denoted by an ellipse. One object is established by a similar-color region, in which each pair of adjacent pixels having color difference less than a predetermined value Γc. A conventional color-difference calculation method is to calculate the color distance between two points: $\Delta C=[(h_1-h_2)^2+(s_1-s_2)^2+(v_1-v_2)^2]^{1/2} \leq \Gamma_c$, wherein $h_i$, $s_i$ and $v_i$ are the three components of the HSV (Hue, Saturation, and Value) color space, and ΓC is a predetermined value. $\Gamma_c$ may have different values to meet various user's queries. The smaller the value of $\Gamma_c$, the more objects from an image.

It is to be noted: there are many methods to construct objects via similar-color regions (such as regions of $\Delta C \leq \Gamma_c$). In the present invention, an object is denoted by an ellipse. However, an object may also be denoted by another geometrical shape, such as a rectangle or a circle. Each region may also comprise a plurality of objects. For example, a big ellipse may be firstly placed inside a similar-color region, and then several smaller ellipses (such as four ellipses) are filled into the region outside the big ellipse but inside the similar-color region. For the detailed technology of constructing an objects from similar-color regions, refer to Chad Carson, Serge Belongie, Hayit Greenspan, and Jitendra Malik, "Blobworld : Image Segmentation Using Expectation-Maximization and Its Application to Image Querying", IEEE Trans. On Pattern Analysis and Machine Intelligence, 24(8), 1026-1038, August 2002.

Refer to FIG. 4 a diagram schematically showing an embodiment of a feature database. The image feature database comprises fields for image I.D. 241, keywords 242, color parameters 243, texture parameters 244, shape parameters 245 and position parameters 246. The field for image I.D. 241 is used to record the indexes for images, such as the serial numbers of images. The field for keywords 242 is used to record the keywords describing images and implement keyword image searches. The field for color parameters 243 is used to record the color parameters of the objects of each image. The field for texture parameters 244 is used to record the texture parameters of the objects of each image. The field for shape parameters 245 is used to record the shape parameters of the objects of each image. The field for position parameters 246 is used to record the position parameters of the objects of each image.

Suppose the hamburger image 36 shown in FIG. 3 is the i-th image in the image database 22. Then, the hamburger image 36 has an image I.D. 241 of "i" in the feature database 24. The hamburger image 36 has a keyword $key_{i,1}$ of "hamburger" and a keyword $key_{i,2}$ of "food". As the hamburger image 36 has $m_i$ pieces of objects 50, it has $m_i$ sets of parameters. For example, the second object of the hamburger image 36 has a color parameter 243 of $(h_{i,2}, s_{i,2}, v_{i,2})$, which ordinarily represents the average color value of the second object region.

The texture parameters 244 of each object may be obtained with a wavelet extraction technology. For example, the wavelet filters of ten frequency bands may be used to extract ten standard deviation values from different frequency bands of the texture of the object to represent the texture parameters of the object region. Thus, the second object of the hamburger image 36 has the texture parameters of $(t_{i,2,1})$, $(t_{i,2,2})$, ..., $(t_{i,2,10})$. For the detailed technology of the wavelet extraction technology, refer to S. Livens, P. Scheunders, G Van de Wouwer, and D. Van Dyck, "Wavelets for Texture Analysis, and Overview", In Proc. IPA, IEEE Pub. No. 443, Volume 1, pages 581~585, 1997.

Refer to FIG. 3(b). In this embodiment, each object 50 is denoted by an ellipse. The shape of an ellipse is determined by the lengths of the major axis and the minor axis $(L_1, L_s)$. Thus, the shape parameter may adopt $Tan^{-1}(L_s/L_1)=\theta$ in this embodiment. For example, the second object of the hamburger image 36 has a shape parameter of $\theta_{i,2}$. The shape parameter may vary with the geometry of the shape used to denote the object 50. If an object comprises several objects, the number of the shape parameters will increase in principle, and the calculation method thereof will be different. For the detailed technology of the shape parameter, refer to P. L. Rosin, "Measuring Shape: Ellipticity, Rectangularity, and Triangularity", 15$^{th}$ Int. Conf., Pattern Recognition, Vol. 1, pp. 952-955, 2000.

As each object 50 is denoted by an ellipse in this embodiment, the position parameter may adopt the coordinate of the center of the ellipse. For example, the second object of the hamburger image 36 has a position parameter of $(x_{i,2}, y_{i,2})$. If one object comprises several objects, the position parameter may adopt the coordinate of the geometrical center of the component objects.

Figure 5:
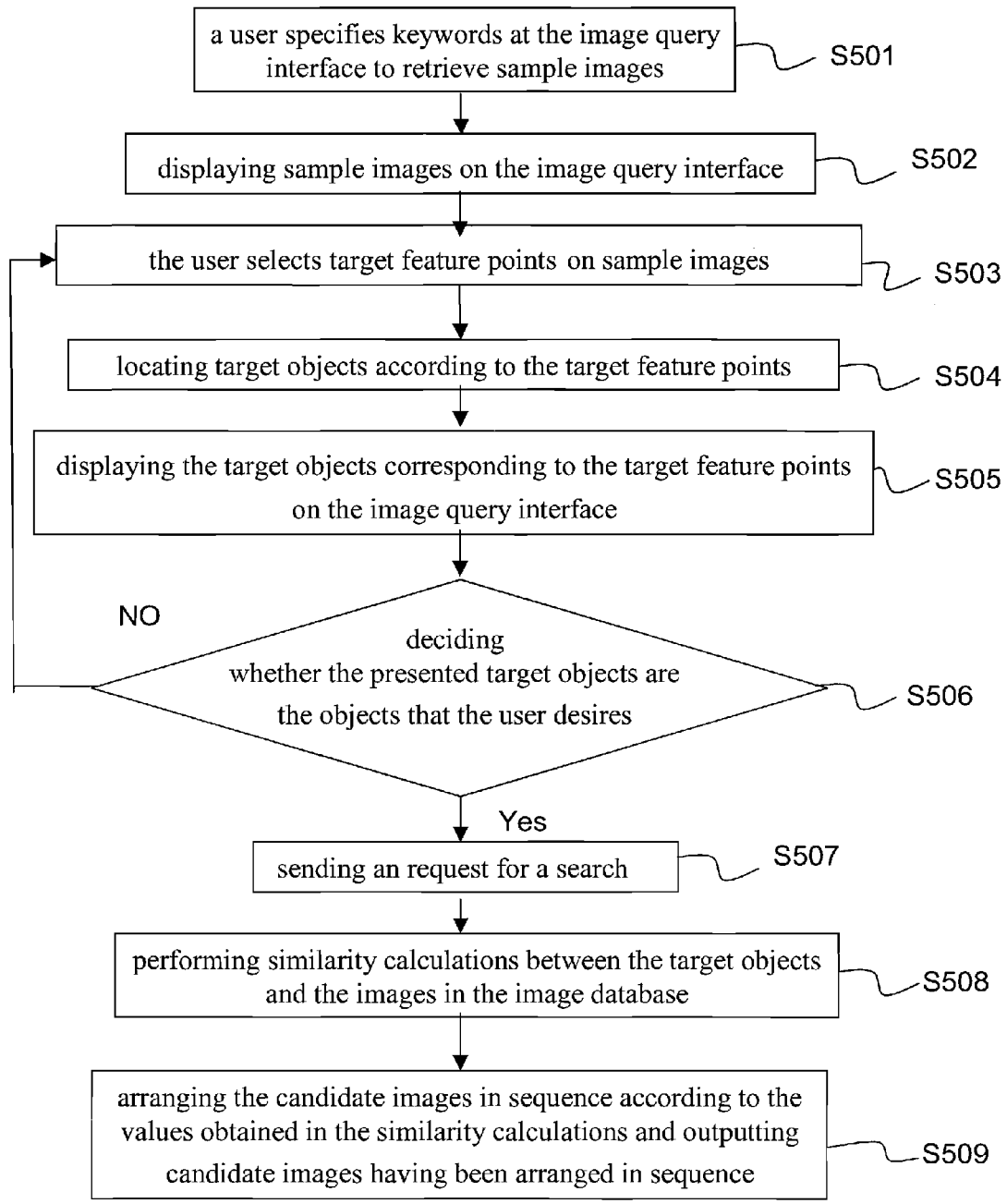
FIG. 5 is a flowchart of the process that the image search engine searches for the relevant images according to the present invention.

Refer to FIG. 5 a flowchart of the process that the image search engine searches for the relevant images according to the present invention.

Figure 6:
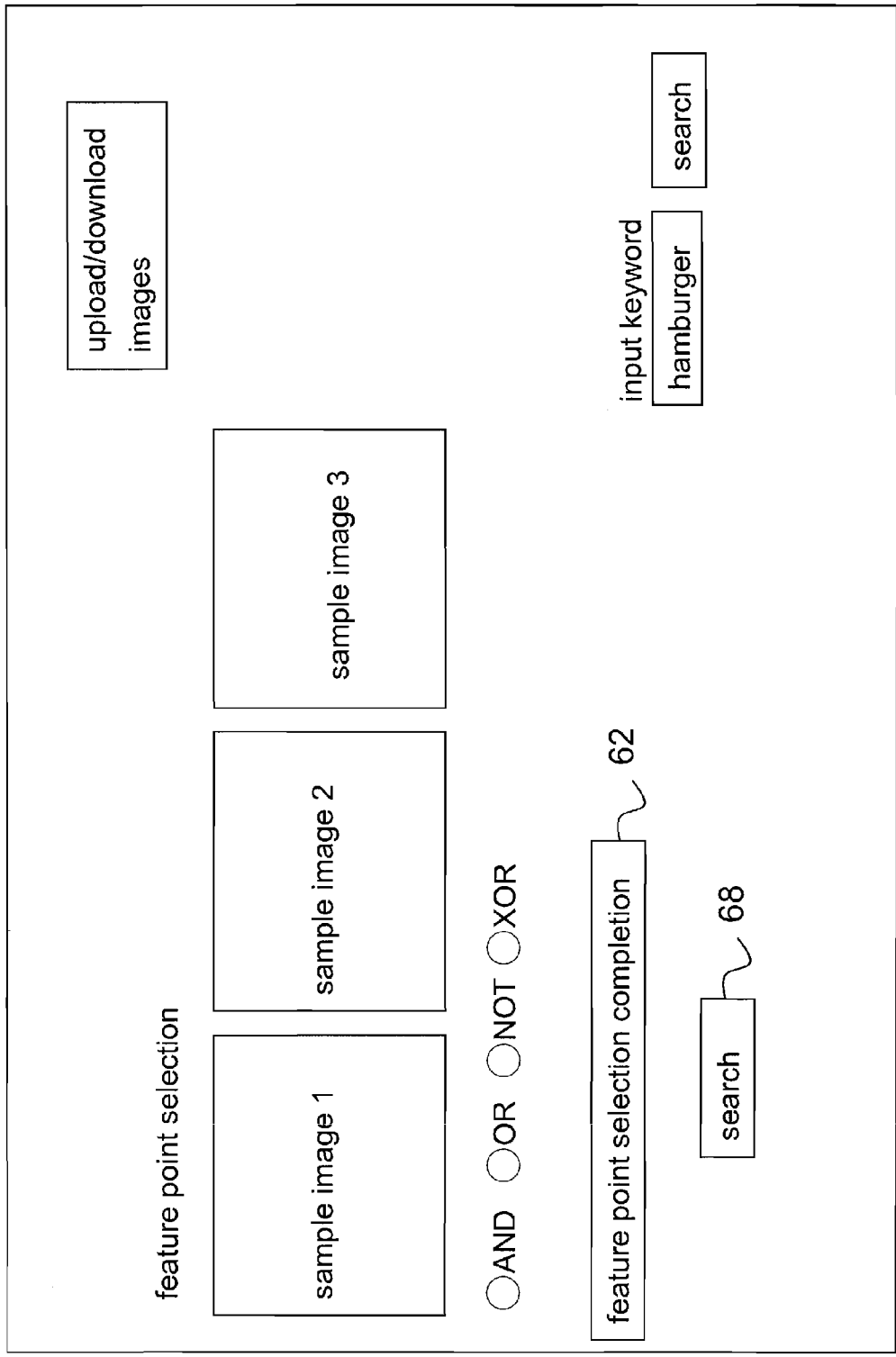
FIG. 6 is a diagram schematically showing an embodiment of an image query interface according to the present invention.
Figure 7:
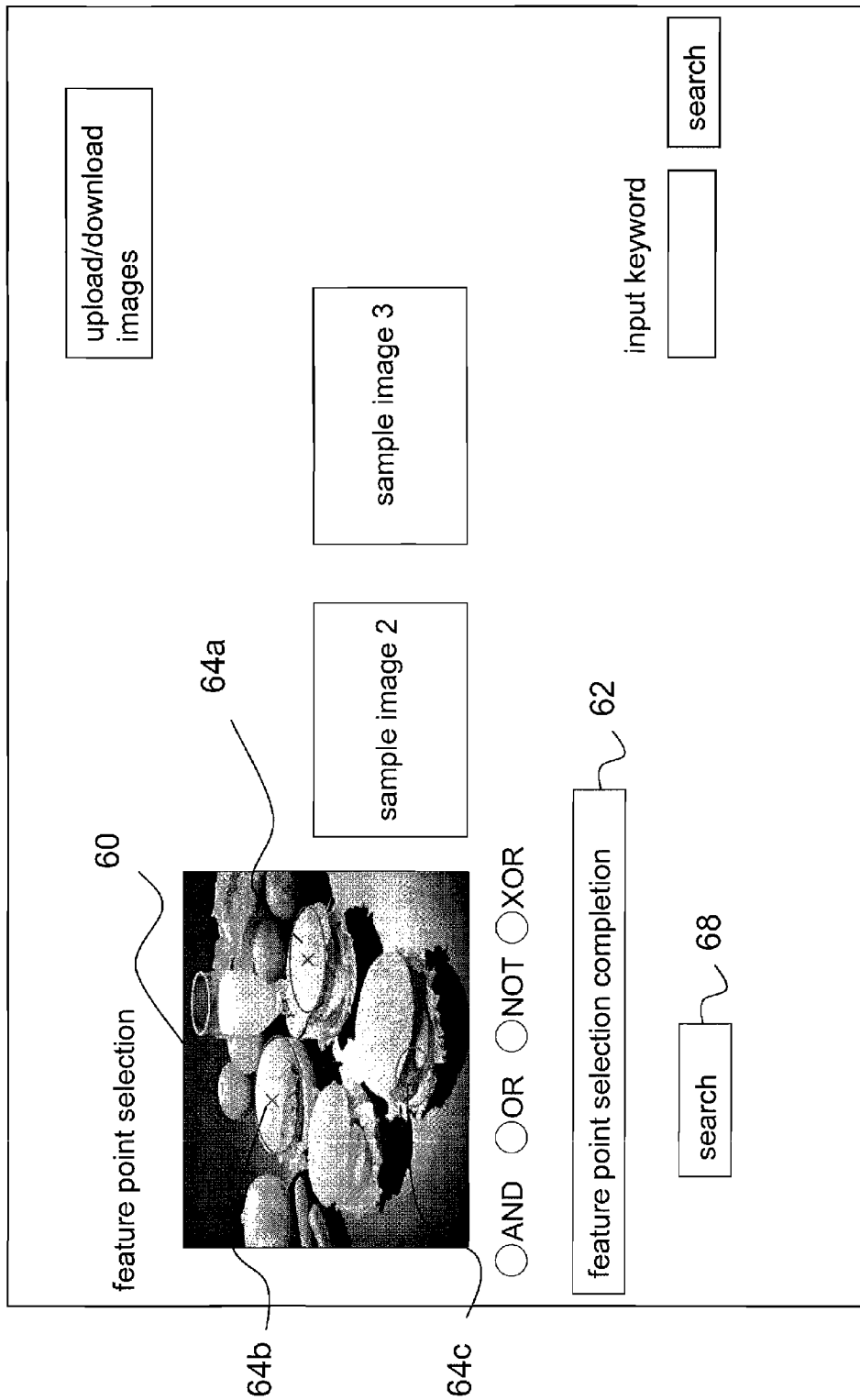
FIG. 7 is a diagram schematically showing that a user selects target feature points on an image query interface according to the present invention.

In Step S501, a user utilizes an image query interface 34 shown in FIG. 6 to input his search queries. In Step S502, the image query interface 34 presents several sample images 60, as shown in FIG. 7. For example, when the user inputs "hamburger" for a keyword query, several hamburger images having been extracted with several feature parameters (such as color parameters, texture parameters, shape parameters, etc.) will be selected from the image database 22 to function as sample images 60. It is to be noted that the hamburger images herein are only to exemplify the sample images.

Naturally, the sample images may also be the pictures uploaded by the user himself. It is to be noted: the pictures uploaded by the user himself cannot be used in an image search unless they are processed by the object-processing program to obtain a plurality of objects and the corresponding parameters of each object.

In Step S503, the user may visually specify the interested target feature points on the sample images. For example, a user who interests in only the bun and patty of a hamburger, may click a mouse button to select appropriate regions on the hamburger images as target feature points 64a, 64b and 64c, as shown in FIG. 7. The number of the target feature points 64 should be greater than or equal to 1. Describe the above statement with a mathematical expression: The user selects q target feature points, and $q \geq 1$.

After selecting the feature points, the user presses the "Feature Point Selection Completion" button 62.

In Step S504, the image search system searches for the target objects corresponding to the target feature points. For example, as the sample image 60 in FIG. 3 is the hamburger image 36 of the image database, the feature-point check program 26 finds out in the hamburger image 36 the objects corresponding to the target feature points 64a, 64b and 64c according to the coordinates of the target feature points 64a, 64b and 64. In other words, the feature-point check program finds out three corresponding target objects 50a, 50b and 50c from the $m_i$ pieces of objects 50 of the hamburger image 36.

In Step S505, the target objects corresponding to the feature points are displayed. Thus, the user may notice the target objects corresponding to the feature points he selects.

In Step S506, the user determines whether the presented target objects are exactly what he wants. If they are not, the process returns to Step S503 to select another target feature points again. The same process will be repeated until satisfactory target objects are obtained.

In Step S507, the user presses the "Search" button 68 to terminate the query process and to start an image search.

In Step S508, the feature-similarity calculation program 28 undertakes the similarity calculations between the target objects that the user selects and other images of the images database 22 (referred to as candidate images thereinafter). The similarity between each target object and the object of the candidate image is calculated based on the feature parameters (such as the color parameters, the texture parameters and the shape parameters).

The embodiment of the calculation of the similarity between two objects is demonstrated below. The distance ($\Delta D$) between two candidate objects may be obtained from the weighted summation of the distance between color parameters, the distance between texture parameters and the distance between shape parameters:

$$\Delta D = W_c \cdot \Delta D_c + W_t \cdot \Delta D_t + W_s \cdot \Delta D_s$$

wherein $\Delta D_c$, $\Delta D_t$ and $\Delta D_s$ respectively denote the distance between color parameters, the distance between texture parameters and the distance between shape parameters, and $W_c$, $W_t$ and $W_s$ are respectively the weighting factors of the distances of color, texture and shape. The weighting factors may be $W_c: W_t: W_s = 0.5: 0.3: 0.2$.

Let the hamburger image 36 be a sample image 60, and a similarity calculation is to be performed between the sample image 60 and the j-th candidate image of the image database 22. The similarity calculation is demonstrated with the distance between the first object of the hamburger image 36 and the first object of the j-th candidate image:

$$\Delta D_c = \{(h_{i,1}-h_{j,1})^2 + (s_{i,1}-s_{j,1})^2 + (v_{i,1}-v_{j,1})^2\}^{1/2}$$

$$\Delta D_t = \{(t_{i,1,1}-t_{j,1,1})^2 + (t_{i,1,2}-t_{j,1,2})^2 + \ldots + (t_{i,1,10}-t_{j,1,10})^2\}^{1/2}$$

$$\Delta D_s = |\Theta_{i,1} - \Theta_{j,1}|$$

Before calculating the weighted sum $\Delta D$, $\Delta D_c$, $\Delta D_t$, and $\Delta D_s$, should be respectively normalized to have a value between 0 and 1. For the detailed normalization technology, refer to Ruby L. Kennedy, Yuchun Lee, Benjamin Van Roy, Chrostopher D. Reed and Richard P. Lippmann, "Solving Data Mining Problems Through Pattern Recognition 9(5): Normalizing data", Prentice Hall, N.J., 1998.

In the sample image 60, three feature points 64a, 64b and 64c correspond to three target objects 50a, 50b and 50c. Then, $m_j$ pieces of objects of the j-th candidate image will be compared with the three target objects 50a, 50b and 50c.

The distance between the j-th candidate image and each of the target objects 50a, 50b and 50c is calculated as follows:

$$\Delta D_{50a,j} = \text{Min}(\Delta D_{50a,1}, \Delta D_{50a,2} \ldots \Delta D_{50a,mj})$$

In other words, the distance between the target object 50a and the j-th image is the distance between the target object 50a and the object in j-th image that is closest to the target object 50a. For example, if $\Delta D_{50a,2}$ is the minimum among all the distances, the second object of the j-th candidate image is the candidate object corresponding to the target object. Similarly, $$\Delta D_{50b,j} = \text{Min}(\Delta D_{50b,1}, \Delta D_{50b,2} \ldots \Delta D_{50b,mj})$$

$$\Delta D_{50c,j} = \text{Min}(\Delta D_{50c,1}, \Delta D_{50c,2} \ldots \Delta D_{50c,mj})$$

In other words, comparing the similarity between the q target objects and a plurality of objects of each candidate image is to compare each of the q target objects with the corresponding q candidate objects corresponding to the target object, wherein the number of the corresponding candidate objects amounts to q, and the corresponding candidate object with respect to one target object is the object in the candidate image that is closest to the target object. In the abovementioned example, q=3.

Thus, the distance between the target objects 50a, 50b and 50c and the j-th candidate image is calculated as follows:

$$\Delta D_{50abc,j} = \Delta D_{50a,j} + \Delta D_{50b,j} + \Delta D_{50c,j}$$

Therefore, in Step S508, the distances between the target objects and all the candidate images are calculated. Obviously, the i-th image is excluded from the calculations because the i-th image is exactly the sample image 60 in this embodiment. Suppose the number of the candidate images amounts to 1000; thus, the following distance calculation results will be obtained in Step S508:

$$\Delta D_{50abc,1}, \Delta D_{50abc,2} \ldots \Delta D_{50abc,999}, \Delta D_{50abc,1000}$$

It is to be noted: when the images of the image database contain keywords, a key-word search may be undertaken beforehand. For example, the hamburger image 36 has two keywords: "hamburger" and "food", and there are totally fifty candidate images having the keywords "hamburger" and "food" in the image database; then, the similarity calculations may only apply to the fifty candidate images.

In Step S509, the sorting program 30 arranges the candidate images in sequence according to the results of the similarity calculations and then outputs the candidate images in sequence, as shown in FIG. 8.

For the example mentioned above, the smaller the values of $\Delta D_{50abc,1}, \Delta D_{50abc,2} \ldots \Delta D_{50abc,999}, \Delta D_{50abc,100}$, the more front the positions of the corresponding more relevant candidate images.

The amount of the output candidate images arranged in order may be predetermined by an appropriate number or determined by the value of $\Delta D$ less than a specified number.

Besides, if a web search page (such as the Microsoft Internet Explorer) is used as the operating interface, the top ten similar images may be presented firstly. If the user wants to view the next batch of images, he may click on the "Next" button to ask the image search system to transmit the next ten relevant images.

Figure 9:
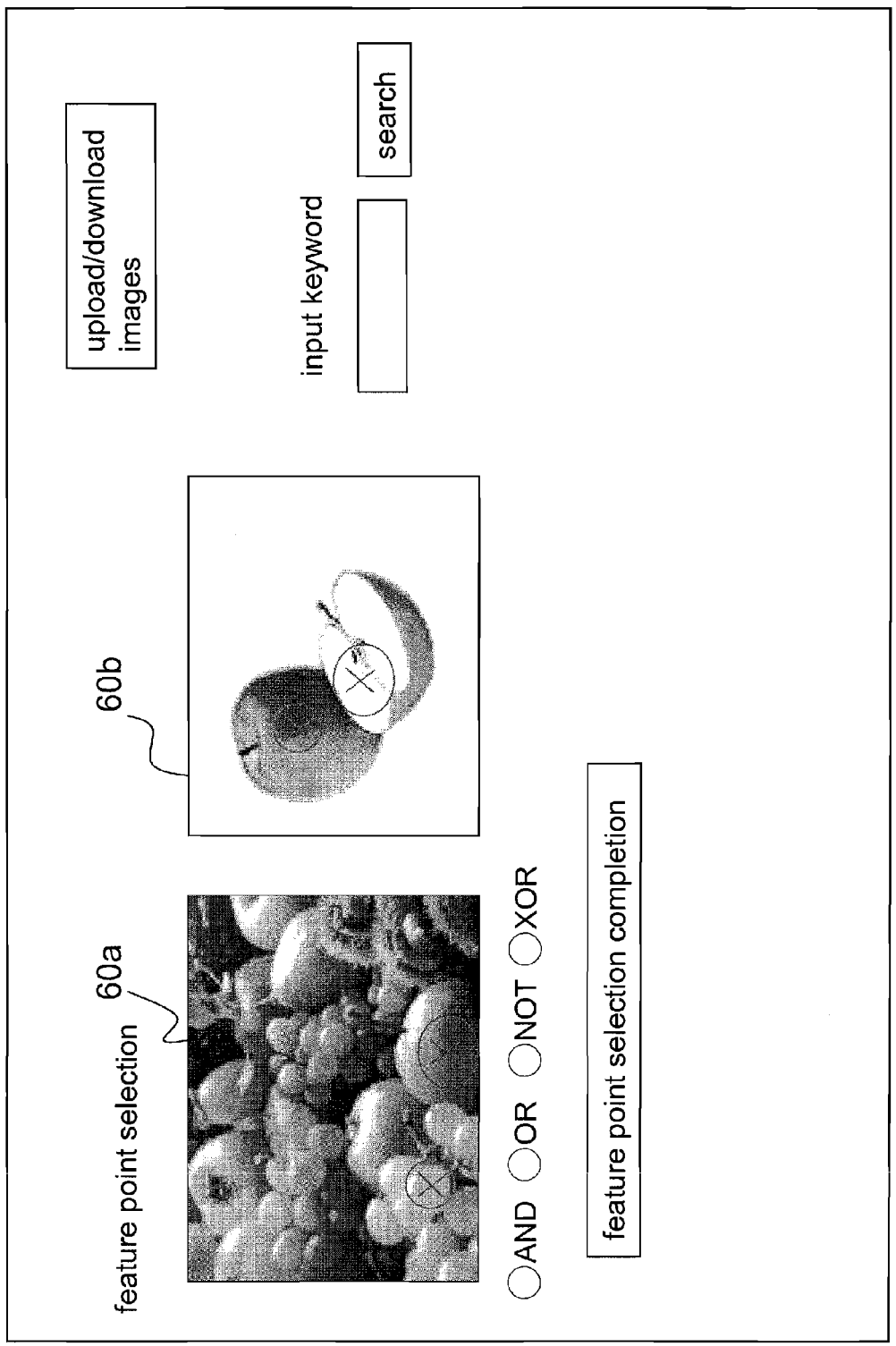
FIG. 9 is a diagram schematically showing that target feature points are selected from a plurality of sample images presented on an image query interface according to the present invention.

In the present invention, image search may be based on several sample images 60. As shown in FIG. 9, the image search interface presents two sample images 60a and 60b. A user may select three feature points from the sample image 60a and also selects feature points (such as three feature points) from the sample image 60b. Then, the user may utilize logic operations, such as "AND", "NOT", "OR" and "XOR", to combine the feature points. For example, the user may use "AND" to combine the six feature points; thus, the Step S504 will find out six target objects corresponding the six feature points; the image search system will utilize the feature parameters corresponding to the six target objects to find out the images having objects similar to the six target objects.

Describe the above statement with a mathematical expression: The image search interface 34 presents p sample images, and a user selects q feature points from the p sample images, wherein p≧1, and q≧1. In the embodiment mentioned above, p=2, and q=6. More precisely to speak, the q target points include q1 target points of the sample image 60a and q2 target points of the sample image 60b, and q=q1+q2 (e.g. 6=3+3). Thus, the image search system will find out the relevant images containing both q1 target objects and q2 target objects.

When the user adopts "NOT" to combine the target feature points, the image search system will find out the relevant images containing the q1 target objects but not the q2 target objects. In the case that the q2 target objects are combined with the q1 target objects by "NOT", the contribution of the q2 target objects to the total similarity of a candidate image is equal to (1−ΔDq2), wherein ΔDq2 has been calculated and normalized by itself alone.

In the abovementioned embodiment, the q1 target objects and the q2 target objects respectively belong to different images. However, the q target objects may also belong to a same image, and the q target objects are divided into q1 target objects and q2 target objects, and then the q1 target objects and the q2 target objects are combined by "AND" or "OR" operations.

Therefore, in the present invention, when there is a plurality of target objects, image search may be performed on the combination of the target objects with logic operations, such as "AND", "NOT", "OR" and "XOR". Further, in Step S504, the search conditions may include the position relationship of the target objects 50a, 50b and 50c. When a candidate image containing the 3 candidate objects with a position relationship different that of the target objects 50a, 50b and 50c, the candidate image will be determined to be dissimilar, or the similarity value thereof is reduced. For the position relationship of a plurality of objects, refer to S. Y. Lee, M. C. Yang and J. W. Chen, "2D B-string: a spatial knowledge representation for image database systems", in Proc. ICSC'92 Second Int. Computer Sci. Conf., 1992; and Li, X. and Qu, X., "Matching Spatial Relations Using db-Tree for Image Retrieval", in Proc. ICPR'98, 1998, pp. 1230-1234. Below, a simple embodiment is used to demonstrate the image search including a position relationship condition.

Figures 10, 11:
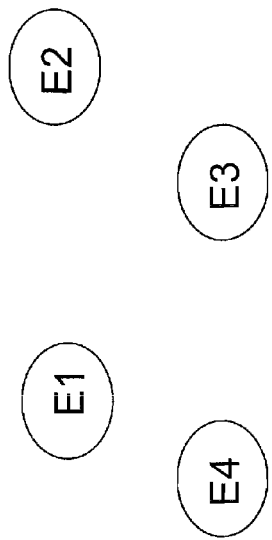
FIG. 10 is a diagram schematically showing the relative positions of target objects E1-E4.
FIG. 11 is a diagram showing a relative-position matrix of the target objects shown in FIG. 10.

The method for comparing the position relationships of a plurality of objects is to construct a relative-position matrix for the query objects. The relative position of target objects E1, E2, E3, and E4 is shown in FIG. 10. The relative positions of two objects may be simply quantified into right (R), left (L), up (U), down (D), right up (RU), up left (UL), left down (LD), and down right (DR). Then, the relative positions of the abovementioned four objects may be recorded with the matrix shown in FIG. 11. The relative positions between two objects are symmetric. If the relative position of object E1 to object E2 is known, the relative position of E2 to E1 is known also. Therefore, recording the relative position of object E2 to object E1 is unnecessary. Thus, the relative positions shown in FIG. 10 may be recorded with a simplified matrix as shown in FIG. 12, wherein only four relative positions—left (L), down (D), left down (LD) and down right (DR) are needed.

Figures 13, 14:
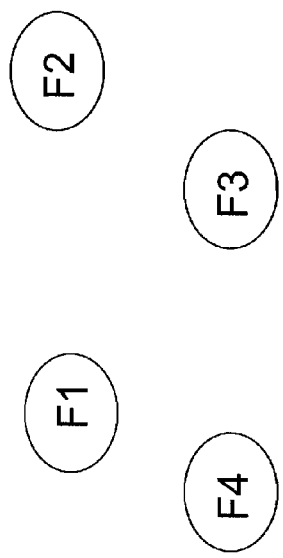
FIG. 13 is a diagram schematically showing the relative positions of target objects F1-F4.
FIG. 14 is a diagram showing a simplified relative-position matrix of the target objects shown in FIG. 13.
Figures 15, 16:
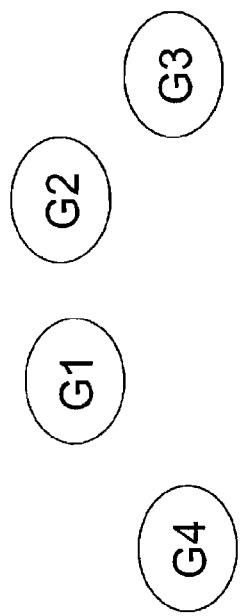
FIG. 15 is a diagram schematically showing the relative positions of target objects G1-G4.
FIG. 16 is a diagram showing a simplified relative-position matrix of the target objects shown in FIG. 15.

Therefore, the four candidate objects F1, F2, F3 and F4 shown in FIG. 13 may be recorded with the matrix shown in FIG. 14; the four candidate objects G1, G2, G3 and G4 shown in FIG. 15 may be recorded with the matrix shown in FIG. 16.

By comparing the matrix shown in FIG. 14 with the matrix shown in FIG. 12, it is found that the two matrixes are identical. Therefore, the position relationships of the four candidate objects F1, F2, F3 and F4 is the same as that of the four target objects E1, E2, E3, and E4.

By comparing the matrix shown in FIG. 16 with the matrix shown in FIG. 12, and it is found that the two matrixes are not identical. Therefore, the position relationships of the four candidate objects G1, G2, G3 and G4 is somewhat different from that of the four target objects E1, E2, E3, and E4.

In conclusion, the present invention proposes an object-based image search system and a method thereof, which comprise a feature-point checking program, a feature-similarity calculating program, a sorting program, an object-processing program and an image query interface, wherein a user may directly specify target feature points from the sample images on the image query interface, and the user may combine the target feature points with logic operations, such as "AND", "NOT", "OR" and "XOR", to form the desired comparing conditions for the similarity analysis of the candidate images; the system then presents the relevant images according to the sequence of similarity. Via the humanized operating interface of the present invention, a user may directly specify the desired objects without using any image-segmenting software tool. Thus, the user is free from the trouble of learning a new software and the errors caused by misusing an image-segmenting software.

Those described above are only the preferred embodiments to exemplify the present invention. However, it is not intended to limit the scope of the present invention. Any equivalent modification and variation according to the spirit of the present invention is to be also included within the scope of the present invention.

What is claimed is:

1. An image search method, which retrieves at least one relevant image from a plurality of candidate images via computerized calculations, wherein each said candidate image has at least one candidate object, and each said candidate object has a plurality of candidate-object feature parameters, comprising the following steps:

a. providing an image query interface, wherein said image query interface presents p sample images, each of said p sample images having a plurality of target features, and a user selects q target feature points defined by a subset of said target features within each of said p sample images, where $p \geq 1$, and $q \geq 1$;

b. locating q corresponding target objects from said p sample images according to said q target feature points, wherein each of said q target objects has a plurality of target-object feature parameters, which includes at least one target-object position parameter, at least one target-object color parameter, at least one target-object texture parameter and at least one target-object shape parameter;

c. performing similarity calculations between said q target objects and said plurality of said candidate images to retrieve images relevant to said q target objects, wherein each said candidate image has at least one candidate feature point defined by a plurality of candidate features within said candidate image, and one corresponding candidate object is located from said candidate image according to said candidate feature point, wherein said candidate object has a plurality of candidate-object feature parameters, which includes at least one candidate-object position parameter, at least one candidate-object color parameter, at least one candidate-object texture parameter and at least one candidate-object shape parameter, that cooperate with said target-object feature parameters of said q target objects to implement said similarity calculations, wherein said performing similarity calculations further comprises performing a weighted summation of the distance between said target-object feature parameters and said candidate-object feature parameters;

d. arranging said candidate images in sequence according to values obtained in said similarity calculations and outputting said candidate images having been arranged in sequence; and wherein the relevant image from a plurality of candidate images is retrieved responsive to a user inputted text keyword or uploaded picture.

2. An image search method according to claim 1, wherein $p \geq 2$.

3. An image search method according to claim 1, wherein said target objects of said sample images are combined by logic operations to meet search requirements.

4. An image search method according to claim 3 comprising similarity calculations between each said candidate object of said plurality of said candidate images and a plurality of said target objects combined by a logic operation.

5. An image search system, which retrieves at least one relevant image from a plurality of candidate images via computerized calculations and comprises a processor, a memory and a storage device, wherein said memory has an image search engine, and said storage device has an image database, and said image database contains a plurality of candidate images, and said processor operates said image search engine to realize the following mechanisms:

Mechanism A: providing an image query interface, wherein said image query interface presents p sample images, each of said p sample images having a plurality of target features, and a user selects q target feature points defined by a subset of said target features within each of said p sample images, where $p \geq 1$, and $q \geq 1$;

Mechanism B: locating q corresponding target objects from said p sample images according to said q target feature points, wherein each of said q target objects has a plurality of target-object feature parameters, which includes at least one target-object position parameter, at least one target-object color parameter, at least one target-object texture parameter and at least one target-object shape parameter;

Mechanism C: performing similarity calculations between said q target objects and said plurality of said candidate images to retrieve images relevant to said q target objects, wherein each said candidate image has at least one candidate feature point defined by a plurality of candidate features within said candidate image, and one corresponding candidate object is located from said candidate image according to said candidate feature point, wherein said candidate object has a plurality of candidate-object feature parameters, which includes at least one candidate-object position parameter, at least one candidate-object color parameter, at least one candidate-object texture and at least one candidate-object shape parameter, that cooperate with said target-object feature parameters of said q target objects to implement said similarity calculations, wherein said performing similarity calculations further comprises performing a weighted summation of a distance between said target-object feature parameters and said candidate-object feature parameters;

Mechanism D: arranging said candidate images in sequence according to values obtained in said similarity calculations and outputting said candidate images having been arranged in sequence; and wherein the relevant image from a plurality of candidate images is retrieved responsive to a user inputted text keyword or uploaded picture.

6. An image search system according to claim 5, wherein $p \geq 2$.

7. An image search system according to claim 5, wherein said target objects of said sample images are combined by logic operations to meet search requirements.

8. An image search system according to claim 7 comprising similarity calculations between each said candidate object of said plurality of said candidate images and a plurality of said target objects combined by a logic operation.

* * * * *